Jan. 28, 1936.   B. F. CONNER   2,029,255
METHOD OF MAKING SHANK BUTTONS
Filed Oct. 28, 1932

Inventor
Benjamin F. Conner
By S. Jay Teller
Attorney

Patented Jan. 28, 1936

2,029,255

UNITED STATES PATENT OFFICE 2,029,255

METHOD OF MAKING SHANK BUTTONS

Benjamin F. Conner, West Hartford, Conn., assignor to Colt's Patent Fire Arms Manufacturing Co., Hartford, Conn., a corporation of Connecticut Application October 28, 1932, Serial No. 640,069

1 Claim. (Cl. 79—2)

The invention relates particularly to a method of making shank buttons consisting of molded materials. Such buttons have heretofore had the thread hole drilled entirely through the full diameter of the molded shank or have had the thread hole molded therein. The general object of the invention is to provide a method of making shank buttons of this class, which method is free from the objections incident to the methods of the aforesaid prior art.

In the manufacture of buttons having a drilled hole through the full diameter of the shank, serious difficulties have been encountered arising from the fact that the molded shank is smooth and very hard and that the drill can be started only by applying considerable pressure thereto. There is a tendency for the rotating drill to follow the lateral curvature of the surface rather than to penetrate the surface, thus resulting either in the breaking of the drill or the displacement of the hole at one side of the center of the shank. The length of the hole is relatively great and the drilling time is, therefore, relatively long, and there is considerable wear on the drills, frequent resharpening and replacement being necessary.

In the manufacture of buttons having the thread holes molded therein, difficulties are encountered on account of the limited capacity, complexity and high cost of the mold and on account of the relatively long time required for molding. The thread holes are molded by means of movable core pins which are delicate and which frequently break, particularly when used with materials requiring high molding pressure.

In accordance with the present invention I provide a method of manufacture for a shank button wherein there are molded recesses at opposite sides of the shank and wherein the thread hole is drilled between these two recesses.

In the accompanying drawing I have shown two buttons made in accordance with my improved method, and I have illustrated the manner of practicing the said method; but it will be understood that departure may be made from the disclosure in the drawing, particularly as concerns the shape or design of the body of the button. The drawing is not to be construed as defining or limiting the scope of the invention, the claim forming a part of this specification being relied upon for that purpose.

Figure 1:
Fig. 1 is a side view of a button made in accordance with the invention.
Figure 2:
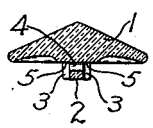
Fig. 2 is a central sectional view through the button shown in Fig. 1.
Figure 3:
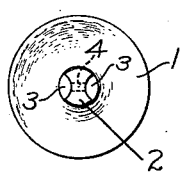
Fig. 3 is a back view of the button.

The button shown in Figs. 1, 2 and 3 of the drawing comprises a body I and a partly round shank 2. The present invention is in no way limited with respect to the shape or design of the body of the button, and this may be varied widely.

Molded in the shank 2 of the button are opposite recesses 3, 3. These recesses preferably extend inward from the outer or back end of the shank. Extending transversely through the shank between the recesses 3, 3 is a drill thread hole 4. The thread hole 4 at its inner side is preferably tangent to the inner walls 5, 5 of the recesses 3, 3.

Figure 4:
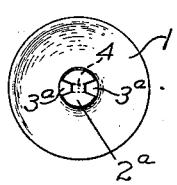
Fig. 4 is a view similar to Fig. 3, but showing an alternative button made in accordance with the invention.

In Fig. 4 I have shown a button similar to that shown in Figs. 1 to 3, but differing in that the recesses 3ª, 3ª in the shank 2ª are narrower and are tapered. The construction is otherwise similar to that shown in Figs. 1 to 3 and repetition of the description is unnecessary.

The walls of the recesses 3, 3 or 3ª, 3ª are adapted to serve as needle guides to facilitate the entry of the needle into the thread hole 4. A button constructed as shown can be more quickly and more conveniently sewed to the garment or fabric with which it is to be used than is possible with a button having a conventional round shank.

Figure 5:
Fig. 5 is a view partly in section showing a button made in accordance with the invention sewed to a fabric.

The recesses 3, 3 or 3ª, 3ª not only serve as needle guides but they also serve to provide spaces in which may be located the convolutions of thread by means of which the button is secured to the garment or fabric. It will be apparent that the successive convolutions of thread as they are applied will be positioned within the recesses 3, 3, thus avoiding ungainly bunches of thread projecting laterally at opposite sides of the shank, as has heretofore been the practice. As clearly illustrated in Fig. 5 the positioning of the thread in the recesses not only improves the appearance but also avoids wear on the thread. The recesses 3, 3 or 3ª, 3ª not only provide spaces for containing the thread as already pointed out, but they also effect a considerable economy of thread as it will be evident that with a construction such as shown each thread convolution is considerably shorter than would be necessary with a shank button of conventional construction. Inasmuch as the thread is all contained within the peripheral outline of the shank, there is less tendency to distort the button hole or to wear the edges thereof.

As already stated, it has heretofore been proposed and attempted to produce molded buttons with the thread holes molded in the round shanks thereof. This requires a very complicated and expensive mold and involves serious molding difficulties with a large percentage of loss. It has also been proposed to mold shank buttons of conventinal form without any thread hole therein and to subsequently drill the thread holes through the round shanks. This procedure has not been satisfactory as the drilling operation has proved troublesome and expensive.

Figure 6:
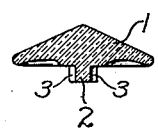
Fig. 6 is a view similar to Fig. 2 showing a molded button as it appears prior to the drilling operation.

In accordance with the present invention the shank of the button is molded with opposite recesses 3, 3 or 3ª, 3ª, as already described in connection with Figs. 1 to 5. A button so molded is shown in Fig. 6. After the molding has been completed the button is held in a suitable fixture (not shown) and the thread hole 4 is then drilled as indicated diagrammatically in Fig. 7. It will be apparent that the recess 3 at the side from which the drill starts, serves as a guide to locate and center the drill. By reason of the two recesses in the shank the thickness of the material to be drilled is less than half of the diameter of a conventional round button shank, with the result that the time for drilling is very greatly reduced with a corresponding reduction in the breakage of drills.

Figure 7:
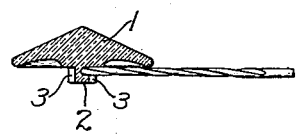
Fig. 7 is a view similar to Fig. 5, but diagrammatically indicating the drilling operation.

From an inspection of Figs. 3 and 4 of the drawing it will be seen that the rear face of the button is smooth and uninterrupted. As indicated in Fig. 7 the drill does not in any way cut or mar this surface.

It will be understood that by "drilling" I mean the forming of a hole in completely molded material by means of the cutting action of a rotary tool, and that I do not intend to include any operation whereby a hole may be formed in soft plastic material by the piercing or punching of a non-rotary tool.

What I claim is:

The hereindisclosed method of making a shank button, which comprises molding the button with an integral shank of relatively small diameter and having opposite recesses therein, and then after the completion of the molding operation drilling a transverse thread hole through the shank from one recess to the other.

BENJAMIN F. CONNER.